United States Patent Office 3,692,711
Patented Sept. 19, 1972

3,692,711
RUBBER-POLYESTER COMPOSITIONS
David Crawford Eaton and Boris Nicholas Leyland, Manchester, England, assignors to Imperial Chemical Industries Limited, London, England
No Drawing. Filed Oct. 5, 1970, Ser. No. 78,307
Claims priority, application Great Britain, Oct. 20, 1969, 51,364/69; Apr. 23, 1970, 19,559/70
Int. Cl. C08c 9/16; C08d 9/10; C08g 39/10
U.S. Cl. 260—3
9 Claims

ABSTRACT OF THE DISCLOSURE

Compositions containing rubber in contact with polyester material, especially vulcanised composition, are stabilised against thermal degradation of the polyester by incorporation of a halogen-substituted heterocyclic compound containing in one aromatic heterocyclic ring one or two groups of the formulae

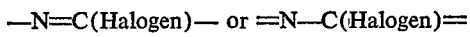
—N=C(Halogen)— or =N—C(Halogen)=

The preferred compounds are 2-chloro-s-triazines having alkyl-substituted amino groups, or especially unsubstituted amino groups, in the 4- and 6-positions.

---

This invention relates to compositions in which rubber is reinforced by polyester materials and more particularly to such compositions which contain halogen-substituted heterocyclic compounds to stabilise the polyester.

Polymeric materials, especially in the form of fibres, are frequently used in rubber compositions as reinforcing agents. Polyesters have some advantages over other polymeric materials, for example in greater strength and durability over rayon and in higher dimensional stability and reduce setting at low temperatures over polyamides, but suffer from the defect of tending to undergo degradation in contact with hot rubber compounds. It has now been found that this degradation may be hindered by certain halogen-containing heterocyclic compounds.

According to the invention there are provided compositions comprising rubber in contact with polyester material which contain one or more halogen-substituted heterocyclic compounds containing in one aromatic heterocyclic ring one or two groups of the formulae

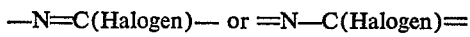
—N=C(Halogen)— or =N—C(Halogen)=

The rubber may be any natural or synthetic rubber, particularly a sulphur-curable rubber. The rubber may be vulcanised or unvulcanised. The presence of the halogen-containing heterocyclic compound is of especial benefit with natural rubber since the degradation of the polyester is normally more rapid in natural rubber than in synthetic rubbers.

As polyester there is meant a polymer of the type obtainable by condensation of one or more polyfunctional carboxylic acids with one or more polyfunctional alcohols, optionally with the inclusion of minor amounts of other compounds containing two or more active hydrogen atoms such as aminoalcohols, and especially fibre- or film-forming polymers derived from bifunctional reactants such as terephthalic acid and ethylene glycol. The polyester will normally be in fibre or fabric form but may be in film or other form used to reinforce rubber.

The halogen is preferably bromine or, especially, chlorine.

By aromatic ring is meant any five- or six-membered nitrogen-containing ring in which there are 6 electrons contributing to its stabilisation.

The heterocyclic ring may be fused to a benzene ring and/or may contain other heterocyclic atoms such as oxygen or sulphur or further nitrogen atoms. The heterocyclic ring or a benzene ring fused to it may optionally be substituted by groups such as chlorine, bromine, nitro, cyano, or a group of the formula $NR_2$, $OR$, $SR$, $R$, $NRNR_2$, $SO_2R$, $SO_3R$, or $SO_2NR_2$ wherein each of the groups represented by R, which may be the same or different, is a hydrogen atom or an alkyl group containing from 1 to 20 carbon atoms which may be optionally substituted by one or more hydroxyl or aryl groups or halogen atoms and which alkyl groups may contain one or more oxygen atoms interrupting a carbon chain, or an alkenyl, cycloalkenyl, cycloalkyl or aryl group or, in the case where a nitrogen atom bears two groups represented by R the two groups R may together with the nitrogen atom form a heterocyclic ring, and any of said aryl or heterocyclic groups may be optionally substituted by one or more alkyl, alkoxy, aryloxy, nitro, cyano, alkylsulphonyl or arylsulphonyl groups, or halogen atoms.

As groups which may be represented by R there are mentioned for example alkyl groups such as methyl, ethyl, n-propyl, isopropyl, tert.-butyl, n-hexyl, nonyl, dodecyl, hexadecyl and octadecyl, alkyl groups substituted by hydroxyl groups such as β-hydroxyethyl and β-hydroxypropyl, β,γ-dihydroxypropyl, alkyl groups substituted by halogen such as β-bromoethyl, γ-chloropropyl, alkyl groups substituted by aryl groups such as benzyl and β-phenylethyl, alkyl groups in which a carbon chain is interrupted by one or more oxygen atoms such as 3-methoxypropyl, β-phenoxyethyl, β-(β'-hydroxyethoxy) ethyl, alkenyl and cycloalkenyl groups such as allyl, propenyl, 2-, iso- or sec-butenyl, oleyl, cyclohexenyl, cycloalkyl groups such as cyclohexyl, aryl groups such as phenyl and naphthyl, substituted aryl groups such as p-tolyl, m-chlorophenyl, o-nitrophenyl, m-xylyl, 2,4-dichlorophenyl, p-methylsulphonylphenyl and m-cyanophenyl, and, in those cases in which a nitrogen atom bears two groups represented by R, the two R groups together with the nitrogen atom may form a heterocyclic ring such as piperidyl and morpholyl.

In those cases where the heterocyclic ring of the halogen-containing heterocyclic compound contains not more than two nitrogen atoms in the ring and only one

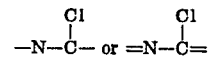

$$-\underset{\underset{\text{Cl}}{|}}{N}-\underset{\underset{}{}}{C}-\text{ or }=\underset{\underset{\text{Cl}}{|}}{N}-\underset{}{C}=$$

group it is preferred that the heterocyclic ring is free from deactivating substituents of the formula $NR_2$.

As examples of halogen-substituted heterocyclic compounds which may be used in the compositions of the invention there are mentioned 2-chlorothiazole, 2-bromothiazole, 2-bromoimidazole, 2-chloroimidazole, 4-chloroimidazole, 3-chloropyrazole, 2-chloropyrazine, 2-bromopyrazine, 2,6-dibromopyrazine, 2,3-dichloropyrazine, 3,6-dichloropyridazine, 3 - chloro - 6 - methylpyridazine, 3-chloropyridazine, 2,6-dibromopyridine, 3-chloroindazole, 3-chloro-5,7 - dinitroindazole, 2 - chlorobenzimidazole, 3,5,7 - trichloroindazole, 2-chloro-4-methylbenzimidazole, 2 - chlorobenzthiazole, 2 - bromobenzthiazole, 2-chloroquinoline, 3-chlorobenzisothiazole, 2-bromoquinoline, 2,4-dichloroquinoline, 2 - chloro - 3 - ethoxyquinoxoline, 1-chloroisoquinoline, 2,7 - dichloroquinoxaline, 3 - chloroisoquinoline, 6 - nitro - 2,3-dibromoquinoxaline, 2,4-dichloroquinoxaline, 2-chloroquinoxaline, 2,4-dichloroquinazoline, 4-chloro-2-methylquinazoline, 2-chloroquinazoline, 3-chlorocinnoline, 3-bromo-4-chlorocinnoline, 3-chloro - 4 - phenoxycinnoline, 1,4-dichlorophthalazine, 1-chlorophthalazine, 4-chloroquinazoline, 1-chloro-7,8-dimethoxyphthalazine, 1,7-dichlorophthalazine, 2-chlorobenzoxazole, 4 - isopropyl - 2 - chloroquinazoline, 4-chloro - 5 - nitroquinazoline, 2-bromobenzoxazole, 2- chloro - 4,5 - dimethylthiazole, 2,4-dibromo-1,5-dimethylimidazole and 3,5-dichloro-4-methyl-1-phenylpyrazole.

It is preferred to use halogen-substituted heterocyclic compounds of the formula:

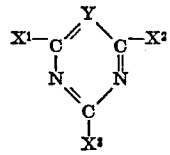

wherein one or two of $X^1$, $X^2$ and $X^3$ represent halogen and the other or others represent a group of the formula $NH_2$, OR, SR, R, or $NR—NR_2$, and Y is a nitrogen atom or a carbon atom carrying as substituent a nitro or cyano group or a group of the type represented by $X^1$ or a group of the formula $SO_2R$, $SO_3R$ or $SO_2N_2$, wherein R has the meaning given hereinbefore.

In those heterocyclic compounds in which Y represents a nitrogen atom it is preferred that only one of the groups $X^1$, $X^2$ and $X^3$ represents a halogen atom since such compounds in which more than one halogen atom is in these positions tend to interfere with vulcanisation of the rubber. In those heterocyclic compounds in which Y does not represent a nitrogen atom one or two of the group $X^1$, $X^2$ and $X^3$ may be halogen without usually interfering with vulcanisation. Not more than one of the groups $X^2$ and $X^3$ should be halogen atom.

As specific groups which may be represented by R there are mentioned those listed hereinbefore.

As examples of groups which may be represented by $X^1$, $X^2$ and $X^3$ there are mentioned amino, methylamino, propylamino, dodecylamino, dimethylamino, methylethylamino, N - methyl - N-octadecylamino, sec.-butylamino, tert.-octylamino, hydroxy (which may be present in the form of a metallic salt, e.g. with sodium), methoxy, n-hexyloxy, isopropoxy, tert.-butoxy, mercapto, methylmercapto, n-butylmercapto, β-hydroxyethylamino, β(β'-hydroxyethoxy) ethoxy, benzylamino, β-phenylethylamino, β-phenoxyethylamino, anilino, m-tolylamino, o-chloroanilino, p-nitroanilino, N-methylanilino, 4-hydroxynaphthylamino, p-tolyl, phenylmercapto, p-methyl-o-chlorophenylamino, 2,4,6-trimethylphenoxy, hydrazino, 1,1 - dimethylhydrazino, 2,6 - dimethylmorpholino, and imidazolyl.

The groups represented by $X^1$, $X^2$ or $X^3$ may also form linkages between two or more heterocyclic residues, i.e. the two X groups attached respectively to two heterocyclic residues, both of which preferably conform to the formula of the halogen-containing heterocyclic compound used in the compositions of the invention, may together form a linking group comprising a divalent organic radical attached to the heterocyclic residues through a direct link or nitrogen, oxygen, or sulphur atoms. Suitable divalent organic radicals are alkylene such as ethylene or hexamethylene, cycloalkylene such as 1,4-cyclohexylene, arylene such as 1,3-phenylene, combinations of such divalent groups as in 1,4-xylylene, 4,4'-methylenediphenylene, polyarylene, and combinations of such groups with oxygen or sulphur atoms or imido groups as in 3-oxa-pentamethylene. Alternatively, the two X groups may form a linkage by together representing the residue of a cyclic bissecondary amine such as piperazinyl, 4,4'-bispiperidyl or 1,3-propylene bis (4'-piperidyl).

As examples of groups which may be substituent on the carbon atom in Y there are mentioned those groups which are exemplified for $X^1$, $X^2$, and $X^3$ above, and nitro and cyano groups, and groups of the formula $SO_2R$, $SO_3R$ and $SO_2NR_2$ which are exemplified above.

As examples of halogen-containing heterocyclic compounds which may be used in the process of the invention there are mentioned particularly those compounds wherein one X is a chlorine atom and the other two X groups represent optionally substituted amino groups especially those in which the amino groups are unsubstituted or carry one or two alkyl groups since these have minimal effect on vulcanisation.

The halogen-containing heterocyclic compound may be incorporated into the compositions of the invention by any conventional means. The polyester may for example be impregnated with the heterocyclic compound before bringing the polyester into contact with the rubber, but it is preferred to add it to the unvulcanised rubber on conventional rubber compounding plant at the same time as any other rubber adjuvants, and then bring the rubber and polyester together and shape and vulcanise the composition as desired. It is not necessary that the heterocyclic compound be present throughout the rubber composition but only that it be present in adequate amount in the region of any rubber/polyester interface, which may be achieved for example by bonding rubber not containing such a heterocyclic compound to polyester by means of a rubber mix containing heterocyclic compound.

The heterocyclic compound is conveniently used in amount between 0.1 to 10.0%, and preferably between 0.5 and 3.0%, of the rubber containing the heterocyclic compound.

During vulcanisation of the rubber and during subsequent service life, especially in cases where the rubber is exposed to elevated temperatures, the amount of halogen-substituted heterocyclic compound present in the rubber diminishes. However use of the initial amount of halogen-substituted heterocyclic compound given above generally affords a satisfactory service life of the polyester although it is desirable to use amounts within the upper part of the range recommended when the use of the rubber would be expected normally to lead to rapid degradation of the polyester.

The rubber may contain any of the conventional adjuvants used in rubber technology, for example antioxidants, antiozonants, curing agents, accelerators, retarders, blowing agents, peptising agents, fillers and pigments. The presence of the heterocyclic compounds is of especial benefit when the accelerator used is a sulphenamide since the degradation of the polyester is normally especially severe with the use of these accelerators.

The compositions of the invention are of especial value in the manufacture of tyres, particularly tyres which are intended to be run at sustained high speeds. They are also, however, of value in other rubber/polyester compositions which may be exposed in manufacture or service to elevated temperature such as conveyor belting.

The invention is illustrated but not limited by the following examples in which all parts and percentages are by weight unless otherwise specified.

EXAMPLE 1

Rubber mixes of the following composition are compounded on a two-roll mill.

| | |
|---|---|
| Smoked sheet natural rubber | 100 |
| Zinc oxide | 3.5 |
| Stearic acid | 1.5 |
| General processing furnace black | 35 |
| Processing oil | 3.0 |
| Sulphur | 2.5 |
| N-cyclohexylbenzthiazylsulphenamide | 1.0 |
| Heterocyclic compound, as indicated. | |

Lengths of polyethylene terephthalate cord are embedded wholly in samples of the rubber mix and the samples heated in a mould under pressure at 170° C. for 2 hours both to cure the rubber and age the composition at an elevated temperature. The cured samples are then swelled in trichloroethylene for 18 hours, the rubber stripped from the cords, and the breaking strengths of the cords determined. Two samples of polyethylene terephthalate are used, of original breaking strengths 14.3 kg. and 14.9 kg. respectively. All the cords before embedding in the rubber had been treated with a bonding agent and heat set.

The results are given in the table below.

| Additive | Polyester Breaking strength (kg.) after ageing | Breaking strength (kg.) after ageing |
|---|---|---|
| None | 10.5 | 9.0 |
| 2-chloro-4,6-diamino-s-triazine (5%) | 13.6 | 13.7 |

The compounded rubber mixes are tested on Oscillating Disc Rheometer at 150° C. for curing characteristics. The following results are obtained:

| Additive | Induction time (minutes) | Time to 90% cross-linking (minutes) | State of cross-linking at 90% (torque units) |
|---|---|---|---|
| None | 7.3 | 12 | 64 |
| 2-chloro-4,6-diamino-s-triazine | 7.6 | 12.5 | 62 |

EXAMPLE 2

The tests described in Example 1 are repeated using different concentrations of 2-chloro-4,6-diamino-s-triazine. The polyester cords used had original breaking strengths of 14.4 and 14.6 kg. The following results are obtained:

| Amount of additive | Polyester Breaking strength (kg.) after ageing | Breaking strength (kg.) after ageing |
|---|---|---|
| 0 | 6.2 | 6.9 |
| 1% | 11.1 | 10.5 |
| 3% | 12.2 | 13.0 |
| 5% | 12.3 | 13.4 |

| Amount of additive | Induction time (minutes) | Time to 90% cross-linking (minutes) | State of cross-linking at 90% (torque units) |
|---|---|---|---|
| 0 | 7.2 | 11.7 | 69 |
| 1% | 7.6 | 12.5 | 61 |
| 3% | 7.7 | 13.2 | 62 |
| 5% | 7.7 | 12.4 | 60 |

EXAMPLE 3

The tests described in Example 1 are repeated using various halogen-containing heterocyclic compounds in concentrations of 5% of the weight of natural rubber. The polyesters used had original tensile strength of 14.4 and 14.6 kg. The following results are obtained:

EXAMPLE 4

Rubber mixes of the following compositions are compounded on a two-roll mill.

| | |
|---|---|
| Smoked sheet natural rubber | 100 |
| Zinc oxide | 3.5 |
| Stearic acid | 1.5 |
| General processing furnace black | 35 |
| Processing oil | 3.0 |
| Sulphur | 2.5 |
| N-cyclohexylbenzthiazylsulphenamide | 1.0 |
| Heterocyclic compound, 3.0 when used. | |

Lengths of polyethylene terephthalate cord are embedded wholly in samples of the rubber mix and the samples heated in a mould under pressure at 170° C. for 2 hours both to cure the rubber and age the composition at an elevated temperature. The cured samples are then swelled in trichloroethylene for 18 hours, the rubber stripped from the cords, and the breaking strengths of the cords determined. The polyethylene terephthalate cord has an original breaking strength of 16 kg. All the cords before embedding in the rubber had been treated with a bonding agent and heat set.

The results are given in the table below:

| Heterocyclic compound (3%) | Breaking strength of polyester after ageing (kg.) | |
|---|---|---|
| None | 5.9 | 6.4 |
| 2-chloroquinoline | 11.5 | |
| 2,4-dichloroquinoline | 10.1 | |
| 2-chloro-5-methylbenzimidazole | | 10.6 |

EXAMPLE 5

The tests described in Example 1 are repeated using various halogen-containing heterocyclic compounds in concentrations of 3% of the weight of the natural rubber. The tensile strengths of the polyesters used is given after ageing for 2 hours at 175° C. except where otherwise indicated.

| Heterocyclic compound: | Tensile strength of polyester (kg.) |
|---|---|
| None (before ageing) | 15.5 |
| None (after ageing) | 8.3 |
| 2-chloro-4-amino-6-dimethylamino-s-triazine | 11.9 |
| 1,6-bis(2'-chloro-4'-cyclohexylamino-6'-s-triazinylamino)hexane | 11.3 |
| 1,4-bis(2'-chloro-4'-amino-6'-s-triazinylamino)benzene | 13.0 |
| 1,2-bis(2',4'-dichloro-6'-pyrimidylamino)ethane | 12.1 |
| None (before ageing) | 16.0 |
| None (after ageing) | 5.8 |
| 2-chloro-4-amino-6-anilino-s-triazine | 10.5 |
| 4,6-dichloro-2-methylaminopyrimidine | 10.2 |
| 2,4-dichloro-6-methylaminopyrimidine | 10.7 |

| Additive | Breaking strain of polyester after ageing (kg.) | Induction time (minutes) | Time to 90% cross-linking (minutes) | State of cross-linking at 90% (torque units) |
|---|---|---|---|---|
| None | 5.7 | 4.7 | 7.6 | 12.0 | 66 |
| 2-chloro-4,6-diamino-s-triazine | 13.6 | 13.7 | 8.6 | 14.3 | 59 |
| 2-chloro-4,6-bisdimethylamino-s-triazine | 13.8 | 6.9 | 15.1 | 51 |
| 2-chloro-4,6-di-n-propylamino-s-triazine | 13.2 | 7.6 | 12.3 | 60 |
| 2,4-dichloro-6-ethylaminotriazine | 14.0 | 7.2 | 22.4 | 40 |
| 2-chloro-4,6-dianilino-s-triazine | 12.4 | 12.0 | 10.2 | 17.6 | 45 |
| 2-chloro-4,6-dicyclohexylamino-s-triazine | 12.1 | 11.9 | 10.0 | 19.2 | 45.5 |
| 2-chloro-4,6-dihydroxy-s-triazine monosodium derivatives | 13.2 | 12.8 | 7.9 | 16.2 | 48 |
| 4,6-dichloro-2-amino pyrimidine | 13.1 | 10.3 | 14.7 | 49 |
| 4,6-dichloro-2-methyl-5-phenylpyrimidine | 14.3 | 8.4 | 12.7 | 59 |

| Heterocyclic compound: | Tensile strength of polyester (kg.) |
|---|---|
| None (before ageing) | 15.5 |
| None (after ageing) | 7.3 |
| 2-chloro-4,6-di-tert.-octylamino-s-triazine | 12.4 |
| 2-chloro-4-anilino-6-(2'-hydroxy-1'-naphthyl)-s-triazine | 12.6 |
| 2-chloro-4-anilino-6-(2'-hydroxy-1'-naphthyl)-s-triazine | 11.4 |
| 2-bromo-4,6-dianilino-s-triazine | 8.4 |
| 2-bromo-4,6-diamino-s-triazine | 11.7 |
| None (before ageing) | 16.0 |
| None (after ageing) | 7.8 |
| 2-chlorobenzthiazole | 10.4 |
| 1,4-dichloropyridazine | 12.3 |
| 2,3-dichloroquinoxaline | 12.4 |
| 1,4-dichlorophthalazine | 10.7 |
| 2,4-dichloroquinazoline | 11.3 |
| None | 5.4 |
| 2,4-dichloro-6-(2,4'-dimethylphenoxy)-s-triazine | 13.8 |
| 2-(4'-ethoxy-1'-naphthyl)-4-(p-SO₃Na-phenoxy)-6-chloro-s-triazine | 13.3 |
| 2-(4'-hydroxynaphthyl-1'-amino)-4,6-dichloro-s-triazine | 13.6 |
| 2,4-bis(N-ethylanilino)-6-chloro-s-triazine | 11.6 |
| 2-(4'-methoxy-1'-naphthyl)-4-ethylamino-6-chloro-s-triazine | 14.3 |
| None | 4.7 |
| 2,4-dichloro-6-anilino-s-triazine | 13.8 |
| 2-chloro-4,6-dimethoxy-s-triazine | 14.6 |
| 2,4-dichloro-6-phenyl-s-triazine | 13.4 |
| None (before ageing) | 16.0 |
| None (after ageing) | 11.0 |
| 2-chloro-4,6-diphenoxy-s-triazine | 13.7 |
| 2,4-dichloro-6-dimethylamino-s-triazine | 14.5 |
| 2,4-dimorpholino-6-chloro-s-triazine | 13.6 |
| 2-amino-4-chloro-6-hydroxypyrimidine | 13.9 |
| 2,4-dichloro-6-methylpyrimidine | >11.0 |
| None (before ageing) | 16.0 |
| None (after ageing) | 6.4 |
| 2-chloro-4-phenoxy-6-anilino-s-triazine | 9.6 |
| 2-chloro-4-dimethylamino-6-anilino-s-triazine | 11.1 |
| 2-chloro-4-methoxy-6-anilino-s-triazine | 8.5 |
| 2-chloro-4,6-bis(2',6'-dimethylphenoxy)-s-triazine | 12.9 |
| 2-chloro-4,6-bis(2',4',6'-trimethylphenoxy)-s-triazine | 11.4 |
| 2,4-dichloro-6-N-methyl octadecylamino-s-triazine | 9.4 |
| 1,2-bis(2',4'-dichloro-6'-s-triazinylamino)ethane | 13.5 |
| None (before ageing) | 15.5 |
| None (after ageing) | 8.4 |
| 2-(1'-piperidyl)-4-(p-chloro-o-toluidino)-6-chloro-s-triazine | 12.5 |
| N,N'-bis(2',4'-dichloro-6'-s-triazinyl)-1,3-bis(4''-piperidyl)-propane | 12.2 |
| 2-(1'-piperidyl)-4-(p-anisidino)-6-chloro-s-triazine | 11.6 |
| 1,4-bis(2'-di-n-butylamino-4'-chloro-6'-s-triazinylamino)benzene | 12.9 |
| 1,4-bis(2'-isopropoxy-4'-chloro-6'-s-triazinylamino)benzene | 13.3 |
| None (before ageing) | 15.5 |
| None (after ageing) | 7.3 |
| 1,4-dibromopyridazine | 10.0 |
| 1-bromo-4-methoxyphthalazine | 8.6 |
| 2-chloro-3-methoxyquinoxaline | 11.8 |
| None (before ageing) | 14.4 |
| None (after ageing) | 2.7 |
| 2,4-dichloro-6-(4'-chlorophenylthio)-s-triazine | 8.4 |
| 2,4-dichloro-6-m-xylyl-s-triazine | 8.7 |
| 2-chloro-4-(4'-chlorophenylthio)-6-(4'-toluidino)-s-triazine | 5.6 |
| 1,4-dibromo phthalazine | 9.1 |
| 2-chloro-4-m-xylyl-6-anilino-s-triazine | 10.7 |
| None | 6.0 |
| 2-chloro-4-(4'-chlorophenylthio)-6-piperidyl-s-triazine | 9.0 |
| 1-bromo-4-hydroxyphthalazine | 11.0 |
| 2,4-diphenyl-6-chloro-s-triazine | 9.3 |
| 2-chloro-3-(N)-piperidylquinoxaline | 11.5 |
| 2-chloro-4-m-xylyl-6-cyclohexylamino-s-triazine | 11.1 |
| 2,5-dichloro-1,3,4-thiadiazole | 10.9 |
| Aged for 2 hours at 170° C. | |
| None | 10.9 |
| N,N'-bis(2-chloro-4'-isobutylamino-6'-s-triazinyl)-1,3-bis(4''-piperidyl)propane | 12.6 |
| Aged for 2 hours at 170° C. | |
| None | 11.4 |
| 2-chloro-4,6-bis(N-methyloctadecylamino)-s-triazine | 12.4 |
| 1,2-bis(2',4'-dichloro-6'-s-triazinylamino)ethane | 14.7 |
| 2-chloro-4-dimethylamino-6-m-nitroanilino-s-triazine | 14.5 |
| 2,4-dichloro-6-N-piperidyl-s-triazine | 14.6 |
| 2-chloro-4-isobutylamino-6-N-imidazolyl-s-triazine | 14.2 |
| 1,4-bis(2',4'-dichloro-6'-s-triazinylamino)benzene | 14.6 |

EXAMPLE 6

Rubber mixes of the following compositions are compounded, brought into contact with polyethylene terephthalate and, heated in a mould at 175° C. for two hours and the cord strengths then determined as described in Example 1. The initial cord strength is 15.5 kg.

| | | | | | | |
|---|---|---|---|---|---|---|
| Butyl rubber | 100 | 100 | 100 | 100 | 100 | 100 |
| High abrasion furnace black | 50 | 50 | 50 | 50 | 50 | 50 |
| Zinc oxide | 25. | 25 | 25 | 25 | 25 | 25 |
| Petroleum jelly | | 2 | 2 | 2 | 2 | 2 |
| Antioxidant (acetone/diphenylamine condensate) | 1.5 | 1.5 | 1.5 | 15. | 1.5 | 1.5 |
| Tetramethylthiuram disulphide | 1.0 | 1.0 | | | | |
| Mercaptobenzthiazole | 0.5 | 0.5 | | | | |
| di-p-Benzoylquinone dioxime | | | 2.0 | 2.0 | | |
| Mercaptobenzthiazyldisulphide | | | 2.0 | 2.0 | | |
| Bromomethyl alkylated phenol/formaldehyde resin | | | | | 12 | 12 |
| Sulphur | 2.0 | 2.0 | 1.5 | 1.5 | | |
| 2-chloro-4,6-diaminotriazine | | 3.0 | | 3.0 | | 3.0 |
| Cord strength after ageing | 5.2 | 7.5 | 8.8 | 10.7 | 8.3 | 10.1 |

We claim:

1. Compositions comprising sulfur-curable rubber in contact with fibrous polyester material which contain one or more halogen-substituted heterocyclic compounds in amount sufficient to stabilise the polyester, said heterocyclic compound having the formula

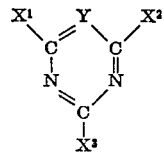

wherein one of the groups represented by $X^1$, $X^2$ or $X^3$ is a halogen atom and each of the other two of these groups, which may be the same or different, is a halogen atom or a group of the formula $NR_2$, $OR$, $SR$, $R$, or $NR—NR_2$, and Y is a nitrogen atom or a carbon atom carrying as substituent a nitro or cyano or a group of the type represented by $X^1$ or a group of the formula $SO_2R$, $SO_3R$ or $SO_2NR_2$, wherein each of the groups represented by R, which may be the same or different, is a hydrogen atom or an alkyl group containing from 1 to 20 carbon atoms which may be optionally substituted by one or more hydroxyl or aryl groups or halogen atoms and which alkyl groups may contain one or more oxygen atoms interrupting a carbon chain, on an alkenyl, cycloalkenyl, cycloalkyl or aryl group or, in the case where a nitrogen atom bears two groups represented by R the two R groups may together with the nitrogen atom form a heterocyclic ring, and any of said aryl or heterocyclic groups may be optionally substituted by one or more alkyl, alkoxy, aryloxy, nitro, cyano, alkylsulphonyl or arylsulphonyl groups, or halogen atoms.

2. Compositions as claimed in claim 1 wherein the rubber is vulcanised.

3. Compositions as claimed in claim 1 wherein the halogen is chlorine.

4. Compositions as claimed in claim 1 wherein Y represents a nitrogen atom and only one of the groups $X^1$, $X^2$ and $X^3$ represents a halogen atom.

5. Compositions as claimed in claim 1 wherein one of the groups $X^1$, $X^2$ and $X^3$ is a chlorine atom and the other two are optionally-substituted amino groups.

6. Compositions as claimed in claim 5 wherein each optionally-substituted amino group is a unsubstituted amino group or an amino group carrying one or two alkyl groups.

7. Compositions as claimed in claim 1 wherein the halogen-substituted heterocyclic compound is 2-chloro-4,6-diamino-s-triazine.

8. A composition comprising sulfur curable rubber in contact with fibrous polyester material and containing a halogen-substituted heterocyclic compound having the formula

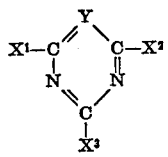

wherein one of the groups represented by $X^1$, $X^2$ or $X^3$ is bromine or chlorine and each of the other two of these groups, which may be the same or different, is bromine, chlorine or a group of the formula $NR_2$, OR, SR, R or $NR$—$NR_2$ and Y is a nitrogen atom or a carbon atom carrying as substituent a nitro or cyano group or a group of the type represented by $X^1$ or a group of the formula $SO_2R$, $SO_3R$ or $SO_2NR_2$, wherein R is hydrogen, alkyl containing 1–20 carbon atoms, β-hydroxyethyl, β-hydroxypropyl, β,γ-dihyroxypropyl, β-bromoethyl, γ-chloropropyl, benzyl, β-phenylethyl, 3-methoxypropyl, β-phenoxyethyl, β-(β'-hydroxyethoxy)ethyl, allyl, propenyl, 2-, iso- or sec-butenyl, oleyl, cycloexenyl, cyclohexyl, phenyl, naphthyl, p-tolyl, m-chlorophenyl, o-nitrophenyl, m-xylyl, 2,4-dichlorophenyl, p-methylsulphonylphenyl, m-cyanophenyl, and where a nitrogen atom bears two groups represented by R, the two R groups together with the nitrogen atom form piperidyl or morpholyl, said compound being present in an amount sufficient to stabilise the polyester.

9. A composition comprising sulfur curable rubber in contact with fibrous polyester material and containing in an amount sufficient to stabilise the polyester a compound selected from the group consisting of
2-chloro-4,6-diamino-s-triazine,
2-chloro-4,6-bis-dimethylamino-s-triazine,
2-chloro-4,6-di-n-propylamino-s-triazine,
2,4-dichloro-6-ethylamino triazine,
2-chloro-4,6-dianilino-s-triazine,
2-chloro-4,6-dicyclohexylamino-s-triazine,
monosodium derivative of 2-chloro-4,6-dihydroxy-s-triazine,
4,6-dichloro-2-amino pyrimidine,
4,6-dichloro-2-methyl-5-phenylpyrimidine,
2-chloroquinoline,
2,4-dichloroquinoline,
2-chloro-5-methylbenzimidazole,
2-chloro-4-amino-6-dimethyl-amino-s-triazine,
1,6-bis(2'-chloro-4'-cyclohexylamino-6'-s-triazinylamino)hexane,
1,4-bis(2'-chloro-4'-amino-6's-triazinoylamino)benzene,
1,2-bis(2',4'-dichloro-6'-pyrimidylamino)ethane,
2-chloro-4-amino-6-anilino-s-triazine,
4,6-dichloro-2-methylaminopyrimidine,
2,4-dichloro-6-methylaminopyrimidine,
2-chloro-4,6-di-tert-octylamino-s-triazine,
2-chloro-4-anilino-6-(2'-hydroxy-1'-naphthyl)-s-triazine,
2-bromo-4,6-dianilino-s-triazine,
2-bromo-4,6-diamino-s-triazine,
2-chlorobenzthiazole,
1,4-dichloropyridazine,
2,3-dichloroquinoxaline,
1,4-dichlorophthalazine,
2,4-dichloroquinazoline,
2,4-dichloro-6-(2,4'-dimethylphenoxy)-s-triazine,
2-(4'-ethoxy-1'-naphthyl)-4-(p-$SO_3Na$-phenoxy)-6-chloro-s-triazine,
2-(4'-hydroxynaphthyl-1'-amino)-4,6-dichloro-s-triazine,
2,4-bis(N-ethylanilino)-6-chloro-s-triazine,
2-(4'-methoxy-1'-naphthyl)-4-ethylamino-6-chloro-s-triazine,
2,4-dichloro-6-anilino-s-triazine,
2-chloro-4,6-dimethoxy-s-triazine,
2,4-dichloro-6-phenyl-s-triazine,
2-chloro-4,6-diphenoxy-s-triazine,
2,4-dichloro-6-dimethylamino-s-triazine,
2,4-dimorpholino-6-chloro-s-triazine,
2-amino-4-chloro-6-hydroxypyrimidine,
2,4-dichloro-6-methylpyrimidine,
2-chloro-4-phenoxy-6-anilino-s-triazine,
2-chloro-4-dimethylamino-6-anilino-s-triazine,
2-chloro-4-methoxy-6-anilino-s-triazine,
2-chloro-4,6-bis(2',6'-dimethylphenoxy)-s-triazine,
2-chloro-4,6-bis(2',4',6',trimethylphenoxy)-s-triazine,
2,4-dichloro-6-N-methyl octadecylamino-s-triazine,
1,2-bis(2',4'-dichloro-6'-s-triazinylamino)ethane,
2-(1'-piperidyl)-4(p-chloro-o-toluidino)-6-chloro-s-triazine,
N,N'-bis(2',4'-dichloro-6'-s-triazinyl)-1,3-bis(4"-piperidyl)-propane,
2-(1'-piperidyl)-4-(p-anisidino)-6-chloro-s-triazine,
1,4-bis(2'-di-n-butylamino-4'-chloro-6'-s-triazinylamino)benzene,
1,4-bis(2'-isopropoxy-4'-chloro-6'-s-triazinylamino)benzene,
1,4-dibromopyridazine,
1-bromo-4-methoxy-phthalazine,
2-chloro-3-methoxyquinoxaline,
2,4-dichloro-6-(4'-chlorophenylthio)-s-triazine,
2,4-dichloro-6-m-xylyl-s-triazine,
2-chloro-4-(4'-chlorophenylthio)-6(4'-toluidino)-s-triazine,
1,4-dibromophthalazine,
2-chloro-4-m-xylyl-6-anilino-s-triazine,
2-chloro-4-(4'-chlorophenylthio)-6-piperidyl-s-triazine, 1-bromo-4-hydroxyphthalazine,
2,4-diphenyl-6-chloro-s-triazine,
2-chloro-3-(N)-piperidylquinoxaline,
2-chloro-4-m-xylyl-6-cyclohexylamino-s-triazine,
2,5-dichloro-1,3,4-thiadiazole,
N,N'-bis(2-chloro-4'-isobutylamino-6'-s-triazinyl)-
   1,3-bis(4''-piperidyl)-propane,
2-chloro-4,6-bis(N-methyloctadecylamino)-s-triazine,
1,2-bis(2',4'-dichloro-6'-s-triazinylamino)ethane,
2-chloro-4-dimethylamino-6-m-nitroanilino-s-triazine,
2,4-dichloro-6-N-piperidyl-s-triazine,
2-chloro-4-isobutylamino-6-N-imidazolyl-s-triazine, and
1,4-bis(2',4'-dichloro-6'-s-triazinylamino)-
   benzene.

References Cited
UNITED STATES PATENTS

| | | | |
|---|---|---|---|
| 3,554,857 | 1/1971 | Barton | 260—873 |
| 3,198,797 | 8/1965 | Dexter et al. | 260—45.8 N |
| 3,379,676 | 4/1968 | Ashton et al. | 260—45.8 N |
| 3,270,016 | 8/1966 | Duennenberger et al. | 260—45.8 N |
| 3,202,681 | 8/1965 | Dexter et al. | 260—45.8 N |
| 3,498,811 | 3/1970 | Kleemann | 260—45.8 N |

JOHN C. BLEUTGE, Primary Examiner

U.S. Cl. X.R.

161—231; 260—23.7 M, 33.6 AQ, 45.8 N, 79.5 B, 873